United States Patent
Theobald

(10) Patent No.: US 10,813,191 B2
(45) Date of Patent: Oct. 20, 2020

(54) METHOD OF LIVESTOCK REARING AND A LIVESTOCK SHED

(71) Applicant: GREENGAGE LIGHTING LTD, Kingston (GB)

(72) Inventor: James Theobald, Kingston (GB)

(73) Assignee: GREENGAGE LIGHTING LTD, Kingston (GB)

( * ) Notice: Subject to any disclaimer, the term of this patent is extended or adjusted under 35 U.S.C. 154(b) by 750 days.

(21) Appl. No.: 15/204,782

(22) Filed: Jul. 7, 2016

(65) Prior Publication Data
US 2016/0323971 A1  Nov. 3, 2016

Related U.S. Application Data

(63) Continuation-in-part of application No. PCT/EP2015/050080, filed on Jan. 6, 2015.

(30) Foreign Application Priority Data

Jan. 8, 2014 (GB) .................................. 1400288

(51) Int. Cl.
*A01K 29/00* (2006.01)
*A01K 31/22* (2006.01)
(Continued)

(52) U.S. Cl.
CPC .............. *H05B 47/105* (2020.01); *A01K 1/00* (2013.01); *A01K 29/005* (2013.01); *A01K 31/04* (2013.01);
(Continued)

(58) Field of Classification Search
CPC ........ A01K 1/00; A01K 29/005; A01K 31/04; A01K 31/20; A01K 31/22
(Continued)

(56) References Cited

U.S. PATENT DOCUMENTS 4,448,150 A * 5/1984 Catsimpoolas ...... A01K 29/005
119/455
5,990,454 A * 11/1999 Westerberg .......... H05B 3/0076
219/411
(Continued)

FOREIGN PATENT DOCUMENTS

CN  202421924 U  9/2012
EP  1579804 A1  9/2004
(Continued)

OTHER PUBLICATIONS

International Search Report and Written Opinion dated May 20, 2015 for International Application No. PCT/EP2015/050080.
(Continued)

*Primary Examiner* — Marc Burgess
(74) *Attorney, Agent, or Firm* — Nixon & Vanderhye P.C.

(57) ABSTRACT

A method of rearing chickens comprises providing a chicken shed (10) having a floor area (12) over which the chickens can move freely. The shed (10) is provided with a plurality of lights (18) arranged to illuminate respective different regions of the floor area (12) so that, collectively, the lights (18) are able to illuminate substantially all of the floor area (12). The shed (10) is provided a plurality of cameras (20) arranged to view respective different regions of the floor area (12) so that, collectively, the cameras (20) are able to view substantially all of the floor area (12). Chickens are provided in the livestock shed (10) on the floor area (12). A controller (22) is provided and is operatively connected to the lights (18) and to the cameras (20). The controller (22) receives and analyses signals, such as images, from the cameras (20). The controller (22) controls the lights (18) to adjust illumination provided to the floor area (12) by the controlled lights (18) in a manner dependent on the signals from the cameras (20). The controller (22) is able to control each light (18) independently of the other lights (18). In some situations, the
(Continued)

control of the lights (18) causes a predetermined desired response in the chickens. In some cases, the predetermined desired response overcomes or circumvents an undesirable situation recognised by the controller from analysis of the signals from the cameras (20).

4 Claims, 3 Drawing Sheets

(51) Int. Cl.
| | |
|---|---|
| *A01K 1/00* | (2006.01) |
| *A01K 31/20* | (2006.01) |
| *G06K 9/00* | (2006.01) |
| *H05B 47/105* | (2020.01) |
| *A01K 31/04* | (2006.01) |
| *H04N 5/235* | (2006.01) |
| *H04N 5/247* | (2006.01) |
| *H04N 7/18* | (2006.01) |

(52) U.S. Cl.
CPC ............. *A01K 31/20* (2013.01); *A01K 31/22* (2013.01); *G06K 9/00335* (2013.01); *H04N 5/2354* (2013.01); *H04N 5/247* (2013.01); *H04N 7/181* (2013.01)

(58) Field of Classification Search
USPC .......................................................... 119/442
See application file for complete search history.

(56) References Cited

U.S. PATENT DOCUMENTS

| | | | | |
|---|---|---|---|---|
| 6,810,832 | B2* | 11/2004 | Ford | A01K 1/0041 119/437 |
| 8,232,731 | B2* | 7/2012 | Van Leeuwen | A01K 1/00 315/134 |
| 8,876,313 | B2* | 11/2014 | Grajcar | A01K 1/00 119/437 |
| 9,094,539 | B1* | 7/2015 | Noble | H04N 7/00 |
| 9,807,983 | B2* | 11/2017 | Yuki | A01K 29/005 |
| 9,955,551 | B2* | 4/2018 | Spero | F21K 9/23 |
| 2004/0158174 | A1* | 8/2004 | Tasch | A61B 5/1038 600/587 |
| 2005/0257748 | A1* | 11/2005 | Kriesel | A01K 29/00 119/51.02 |
| 2010/0236497 | A1* | 9/2010 | Philiben | A01K 11/008 119/712 |
| 2010/0295839 | A1* | 11/2010 | Nagaya | G06F 1/3265 345/212 |
| 2010/0331630 | A1* | 12/2010 | Odio | A61B 5/0205 600/301 |
| 2014/0020635 | A1* | 1/2014 | Sayers | A01K 15/021 119/721 |
| 2015/0156992 | A1* | 6/2015 | Kasahara | A01K 31/00 426/2 |
| 2016/0120144 | A1* | 5/2016 | Kim | A01K 1/0047 119/437 |
| 2016/0242383 | A1* | 8/2016 | Baker, Jr. | A01K 1/00 |

FOREIGN PATENT DOCUMENTS

| | | |
|---|---|---|
| WO | 9933022 A1 | 7/1999 |
| WO | 03056907 A1 | 7/2003 |
| WO | 2008001367 A1 | 1/2008 |
| WO | 2008084379 A2 | 7/2008 |

OTHER PUBLICATIONS

UK Search and Examination report dated Jul. 7, 2014 in corresponding Great Britain Patent Application No. 1400288.5.

\* cited by examiner

METHOD OF LIVESTOCK REARING AND A LIVESTOCK SHED

CROSS-REFERENCE TO RELATED APPLICATION(S)

The present application is a continuation-in-part of International Patent Application No. PCT/EP2015/050080, entitled: A Method of Livestock Rearing and a Livestock Shed, with an international filing date of Jan. 6, 2015, which claims priority to BG Patent Application No. 0100288.5, with a filing date of Jan. 6, 2015, the contents of both of which are hereby incorporated by reference.

The invention relates to a method of livestock rearing and to a shed for livestock.

It is known to provide a chicken shed which has a floor area over which chickens can move freely. The shed is provided with a plurality of lights which are arranged to illuminate respective different regions of the floor area. Collectively, the lights are able to illuminate substantially all of the floor area.

According to a first aspect of the invention, there is provided a method of livestock rearing, comprising: providing a livestock shed having a floor area over which livestock can move freely; providing a plurality of lights arranged to illuminate respective different regions of the floor area so that, collectively, the lights are able to illuminate substantially all of the floor area; providing a plurality of cameras arranged to view respective different regions of the floor area so that, collectively, the cameras are able to view substantially all of the floor area; providing livestock in the livestock shed on the floor area; providing a controller operatively connected to the lights and to the cameras; the controller receiving and analysing signals from the cameras; the controller controlling at least one of the lights to adjust illumination provided to the floor area by said at least one of the lights in a manner dependent on the signals from the cameras.

According to a second aspect of the invention, there is provided a livestock shed comprising: a floor area over which livestock can move freely; a plurality of lights arranged to illuminate respective different regions of the floor area so that, collectively, the lights are able to illuminate substantially all of the floor area; a plurality of cameras arranged to view respective different regions of the floor area so that, collectively, the cameras are able to view substantially all of the floor area; and a controller operatively connected to the lights and to the cameras; the controller being programmed to receive and analyse signals from the cameras and being programmed to control the lights to adjust illumination provided to the floor area by the lights in a manner dependent on the signals from the cameras.

In both the first and second aspects of the invention, the lighting control performed by the controller may improve the efficiency of livestock rearing. For example, the lighting control may help to improve the conversion rate of feed to livestock weight. Alternatively, or in addition, the lighting control may help to improve animal welfare and/or reduce the environmental impact of the livestock rearing.

The following is a more detailed description, by way of example, of embodiments of the invention, reference being made to the appended schematic drawings in which.

Figure 1:
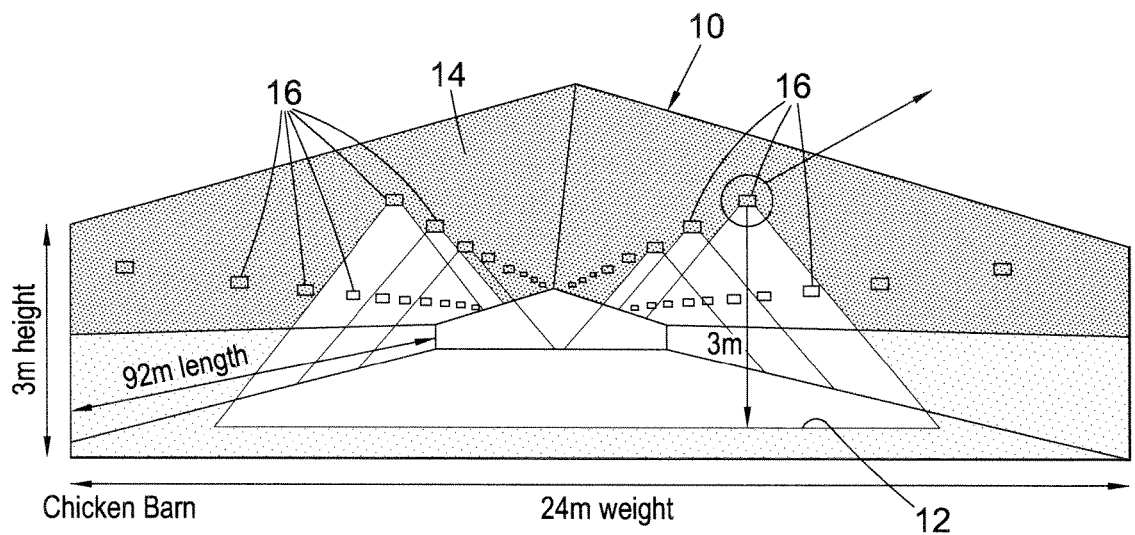
FIG. 1 is a perspective view of a chicken shed.

Referring to FIG. 1, a chicken shed 10 provides a floor area 12 over which chickens can roam freely. The chicken shed 10 has a ceiling 14 on which are mounted a plurality of light and camera integrated units 16.

Figure 2:
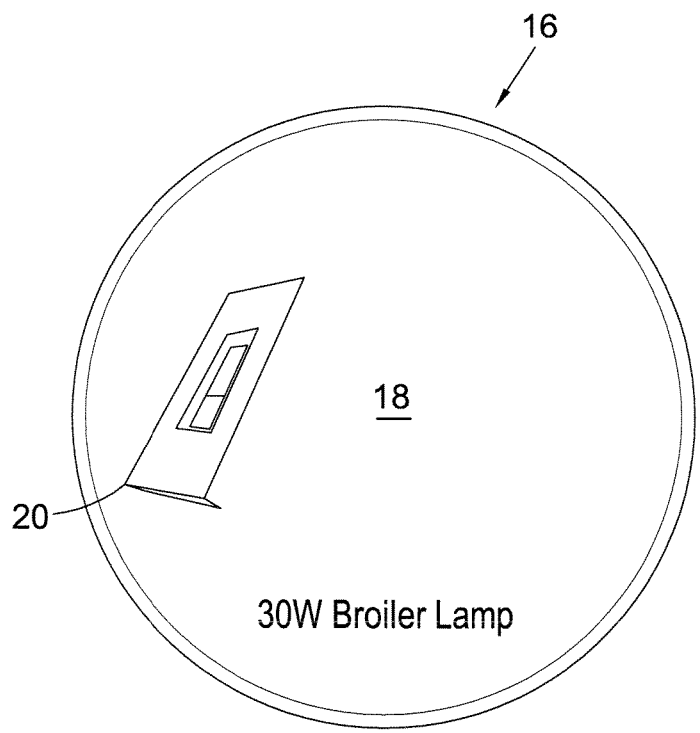
FIG. 2 is a representation of an integrated light and camera unit used in the chicken shed of FIG. 1.

Referring to FIG. 2, each integrated unit 16 comprises both a light unit 18 and also a camera unit 20 integrated in a common housing.

Each light unit 18 is able to illuminate a respective region of the floor area 12 of the chicken shed 10. The regions may overlap. Collectively, the light units 18 are positioned so as to be able to illuminate substantially all of the floor area 12.

Each light unit 18 can be dimmed, and preferably can be dimmed continuously in a range from full intensity to zero illumination. Additionally, each light unit 18 can be operated to vary the wavelength spectrum of the radiation emitted by the light unit 18. For example, each light unit 18 may be able to emit a first standard wavelength spectrum (generally perceived as white light), a second spectrum with an increased component of red and/or infra-red light, and a third spectrum with an increased component of blue and/or ultra-violet light. A preferred light unit 18 uses LEDs to provide the illumination. In this case, dimming may be achieved, for example, by pulse width modulation. Varying the wavelength spectrum could, for example, be achieved by providing each light unit 18 with a plurality of LEDs which emit different coloured light and by selectively turning on or off different ones of the LEDs to vary the overall spectrum of emitted light.

Each camera unit 20 is capable of capturing digital white light images of a respective region of the floor area 12 of the chicken shed 10. The regions may overlap. Collectively, the camera units 20 are positioned so as to be able to image substantially all of the floor area 12. In addition, each camera unit 20 is preferably able to detect the temperature of the region of floor area 12 viewed by the camera unit 20. Preferably each camera unit 20 is able to detect respective temperatures in different areas of the viewed region. For example, each camera unit 20 may be able to capture an infra-red image of the region of the floor area 12 viewed by the camera unit 20. Each camera unit 20 may comprise a single camera. Alternatively, each camera unit 20 may comprise multiple cameras—such as a white light camera and an infra-red camera.

In the current example, each one of the light units 18 is provided together with an accompanying one of the camera units 20 in an integrated unit 16. While such integrated units 16 are preferred because, inter alia, it facilitates mounting, this is not essential and separate light units and camera units could be used. Where integrated units 16 are provided, it is preferred that the field of illumination of the light unit 18 of the integrated unit 16 corresponds generally to the field of view of the accompanying camera unit 20. This simplifies image analysis.

Figure 3:
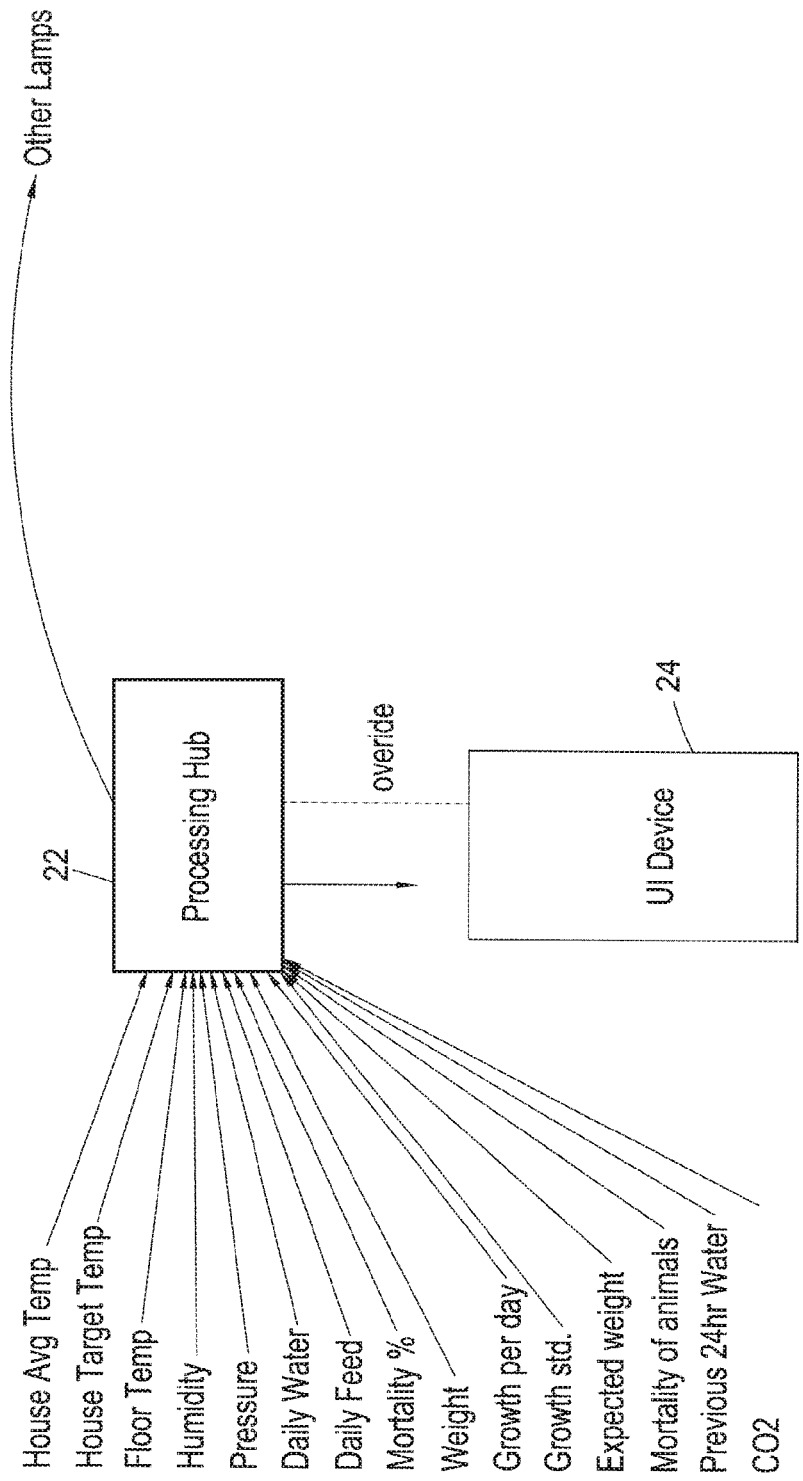
FIG. 3 is a representation of a controller used in the chicken shed of FIG. 1.

FIG. 3 shows a controller 22. The controller 22 comprises a micro-processor (not shown) and a memory (not shown). In addition the controller 22 may comprise various components, such as analogue-to-digital converters, electronic filters, amplifiers, etc., (all not shown) allowing the controller 22 to communicate with the camera units 20 and with the light units 18.

The controller 22 receives input signals from each of the camera units 20. Specifically the controller 22 may, for example, receive white light images, infra-red images and/or temperature signals from the camera units 20.

The controller 22 provides control signals to each of the light units 18. The control signals control the light units 18 to dim and brighten the light units 18 and also to adjust the wavelength spectrum of the light emitted by the light units 18. The controller 22 is capable of controlling each light unit 18 separately from the other light units 18.

The controller 22 identifies each light unit 18 and each camera unit 20 by a respective identification code. Additionally, the controller is programmed with the position of each light unit 18 and the position of each camera unit 20.

As seen in FIG. 3, the controller 22 may be provided with a number of inputs, in addition to the input signals from the camera units 20. For example, the controller 22 may be connected to thermometers for detecting temperatures in different regions of the chicken shed 10, in particular the temperatures of different regions of the floor area 12. The controller may be connected to one or more sensors able to detect one or more of the following variables: humidity of the chicken shed 10; pressure in the chicken shed 10; rate of water consumption; rate of feed consumption; weight of chickens (sensed by weight sensitive pads on the floor area 12); and $CO_2$ concentration.

As shown in FIG. 3, the controller 22 is connected to a user interface device 24 though which other data may be input to the controller 22 if desired.

Critically, the controller 22 is programmed to analyse signals received from the camera units 20 and, on the basis of the analysis, to control the operation of the light units 18. The analysis will generally include analysis of images, such as white light and/or infra-red images, received from the camera units 20.

For example, the controller 22 may be programmed to recognise and distinguish a plurality of undesirable circumstances on the basis of the analysis of the signals from the camera units 20. For each undesirable circumstance, the controller 22 controls at least one of the light units 18 to adjust illumination provided to the floor area by the or each light unit 18 that is controlled. The control of the light units 18 is designed to remedy or circumvent, at least partially, the recognized undesirable circumstance. In some cases, the control of the light units 18 is designed to remedy or circumvent the undesirable circumstance by affecting the behaviour of the chickens.

Various examples of undesirable circumstances, and the corresponding remedial strategies for control of the light units 18 are given in Table 1. These examples are discussed in more detail below. As will be seen, in some of the cases, the control of the light units 18 is determined not only by the nature of the undesirable circumstance but also by the location of the undesirable circumstance.

TABLE 1

| Example | Undesirable Circumstance | Remedy | Effect of Remedy |
|---------|--------------------------|--------|------------------|
| 1 | Chickens walking below optimal average speed | increase intensity of light | Chickens walk more quickly |
| 2 | Chickens walking above optimal average speed | Decrease intensity of light | Chickens walk more slowly |
| 3 | Chickens congregate and body temperature of congregated chickens is too high | Decrease intensity of light in area of congregation and increase intensity of light in neighbouring areas | Chickens disperse to neighbouring areas |
| 4 | Body temperature of chickens is too low | Provide one or more areas of increased light intensity surrounded by areas of decreased light intensity | Chickens congregate in areas of increased illumination and congregation increases body temperature |
| 5 | Temperature of air or litter is too high or too low in a particular zone of the floor area | Reduce light intensity in the zone | Chickens move away from and keep away from the zone |
| 6 | Litter is spoilt in a particular zone of floor area | Reduce light intensity in the zone | Chickens move away from and keep away from the zone |
| 7 | Litter is insufficiently turned in a particular zone of floor area | Increase light intensity in the zone | Chickens move to the zone and turn litter |
| 8 | Above optimal rate of feeding | Control light intensity to slow movement of chickens to the feed hoppers | Reduced rate of feeding |
| 9 | Ground illumination is above or below required level in some or all of the floor area | Adjust lighting intensity in affected regions of floor area | Illumination maintained at required level |
| 10 | Chickens agitated | Adjust spectrum of illumination to include more blue light | Chickens calmed |

EXAMPLES 1 and 2

The rate of conversion of feed to livestock weight is optimised when chickens walk at a certain speed. Speeds above or below the optimum speed reduce the efficiency of conversion. Chickens may be induced to walk at or near the optimum speed by adjusting the light intensity. This can be done by adjusting the intensity of all of the light units 18 uniformly. Alternatively, if some areas of the floor area 12 are lit by natural lighting in addition to the light units 18, then the intensity of those light units 18 which illuminate the naturally lit areas may be adjusted so that overall lighting intensity is generally uniform across the whole floor area 12. Light intensity in different areas of the floor area 12 may be measured by the camera units 20.

The speed of movement of the birds can be measured by analysing images taken at different times. For each image, individual birds are identified and movement of individual birds is tracked over time from image to image. By determining the distances moved by individual birds and by using the timing between the images, the speed of movement can be estimated.

EXAMPLES 3 and 4

The rate of conversion of feed to livestock weight is also affected by the body temperature of the chickens. A body temperature at or near the optimum temperature may be achieved by controlling the degree of congregation of the birds. Congregation can be assessed by analysing white light or infra-red images of the chickens. Body temperature of individual birds or groups of birds can be estimated by analysing infra-red images.

EXAMPLES 5

In Example 5, litter and air temperature can be measured by separate thermometers connected to the controller 22. Alternatively litter temperature can be measured by analysing infra-red images taken by the camera units 20.

EXAMPLES 6 and 7

In Examples 6 and 7, spoiling of the litter, or insufficient turning of the litter, can be detected by analysis of white light images taken by the camera units 20.

EXAMPLE 8

In Example 8, the rate of feeding can be determined by suitable sensors which measure feed levels in the feed hoppers.

EXAMPLE 9

Ground illumination can be measured by the camera units 20.

EXAMPLE 10

Agitation of the chickens is determined by the controller 22 on the basis of white light images taken by the camera units 20.

In addition to the examples given above, which fall into the category of remedying or circumventing undesirable circumstances, the controller 22 may be programmed to perform functions of other types, as demonstrated by the examples given below.

EXAMPLE 11

Light intensity should be increased gradually when chickens are being woken from roost. Overly rapid increases in light intensity can cause stress and heart attacks. The controller 22 may be programmed to optimise the increase in light intensity using feedback obtained by the camera units 20. Specifically, the controller 22 may be programmed to estimate the degree of wakefulness of the chickens (for example by estimating their speed of movement). The controller 22 may use such analysis to optimise the rate or profile of the increase of lighting intensity.

EXAMPLE 12

In a similar manner to Example 11, the controller 22 may be programmed to optimise the dimming of lights, at the start of the roost period, based on feedback from the chickens obtained via the camera units 20.

EXAMPLE 13

The controller 22 may be programmed to adjust the lighting to encourage the birds to mate. An increase in the red light content of the illumination may achieve this.

EXAMPLE 14

The controller 22 may be programmed to estimate the average size and/or weight of the chickens. This may be achieved by analysing images to estimate the area that is covered by the birds and by using a suitable algorithm utilising the area covered by the birds and the number of birds in the floor area 12.

EXAMPLE 15

The controller 22 may be programmed to detect dead birds by image analysis. An alarm may then be raised to alert a human operator.

EXAMPLE 16

The controller 22 may be programmed to detect disease or abnormal growth by image analysis. An alarm may then be raised to alert the human operator.

The controller 22 preferably performs the functions discussed above automatically.

The user interface 24 allows for programming of the controller 22 and also provides information to the human operator.

Figure 4:
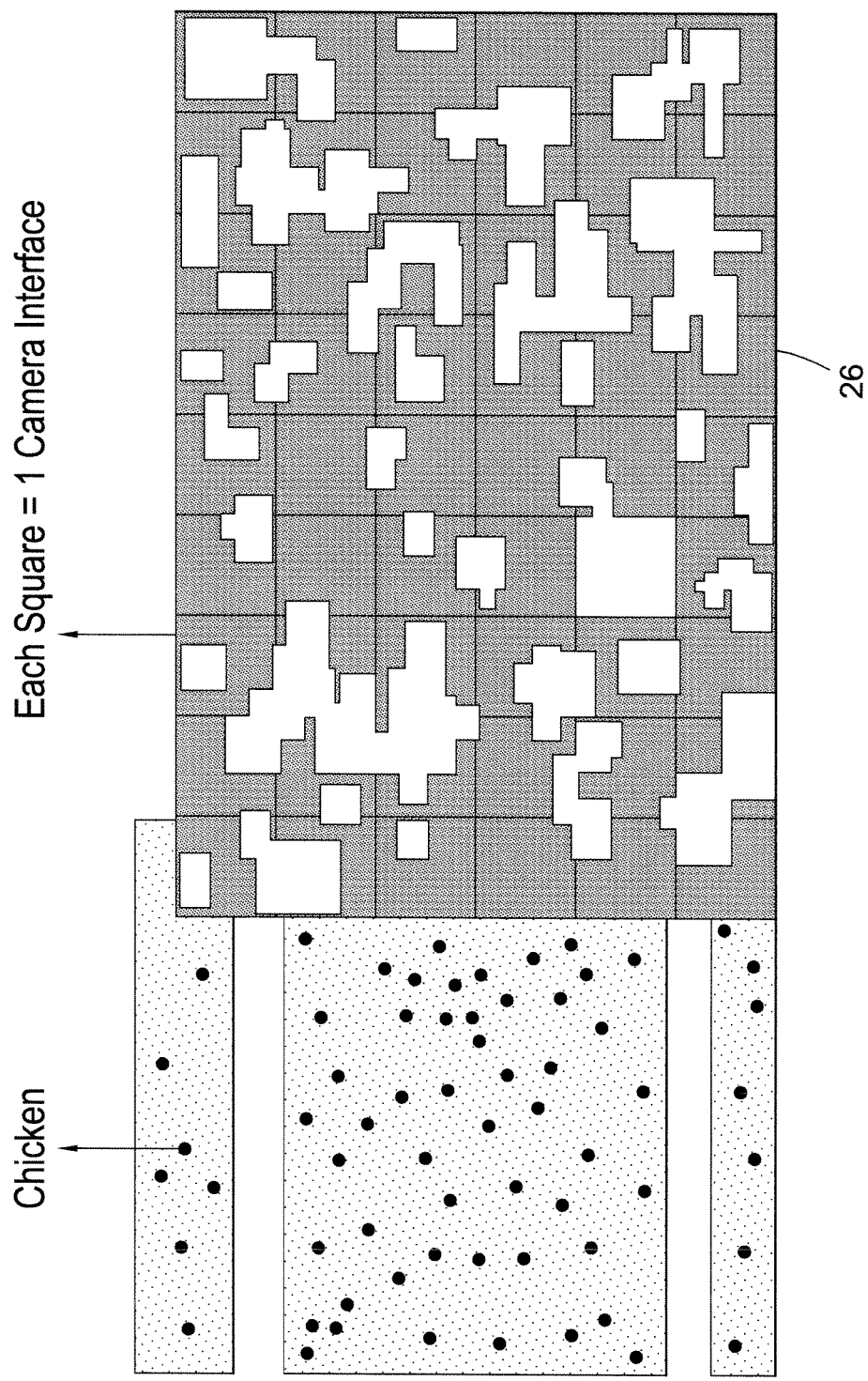
FIG. 4 is a representation of a stage in an image analysis procedure performed by the controller of FIG. 3.

FIG. 4 shows that it is not necessary for the image analysis performed by the controller 22 to identify individual birds. In FIG. 4, an image obtained from a camera unit 20 is converted into a density map in which density of chickens is represented by white blocks.

It will be appreciated that the invention may be modified in many ways while remaining within the scope of the claims. In particular the invention is applicable to livestock other than chickens. It could, for example, be applied to pigs.

According to some embodiments, the camera may be any one or more of an imaging camera, a thermal imaging camera, a time-of-flight camera. According to some embodiments, the floor area may be the floor of a shed, house, cage or other structure, which may or may not be solid or have a continuous surface, for example which may or may not comprise slats.

The invention claimed is:
1. A method of livestock rearing, comprising:
providing a livestock shed having a floor area over which livestock can move freely;
providing a plurality of lights arranged to illuminate respective different regions of the floor area so that, collectively, the lights are able to illuminate substantially all of the floor area;
providing a plurality of cameras arranged to view respective different regions of the floor area so that, collectively, the cameras are able to view substantially all of the floor area;
providing livestock in the livestock shed on the floor area;
providing a controller operatively connected to the lights and to the cameras;
receiving and analysing signals from the cameras with the controller;

controlling, with the controller, at least one of the lights to adjust illumination provided to the floor area by said at least one of the lights in a manner dependent on the signals from the cameras, wherein said adjustment of the illumination comprises adjusting a wavelength spectrum of the illumination, wherein the controller is capable of controlling each one of the lights separately from the other lights;

wherein the method further includes a response of the livestock of a predetermined desired nature, said response being caused by said adjustment of the illumination provided to the floor area by said at least one of the lights;

wherein said analysis of the signals indicates an undesirable circumstance and the response of the livestock at least partially remedies or circumvents the undesirable circumstance;

wherein the undesirable circumstance is an undesirable characteristic or behavior of the livestock and wherein said predetermined desired response eliminates or reduces the undesirable characteristic or behavior; and wherein the undesirable characteristic or behaviour is:
  movement of the livestock at a non-optimal speed and the response is a change in speed of the livestock so that the speed of the livestock approaches the optimal speed; or
  congregation of the livestock and the response is dispersal of the congregation.

2. A method according to claim 1, wherein
a) the receiving and analysis of the signals and the controlling of the at least one of the lights are automated; and
b) the livestock are chickens.

3. A method of livestock rearing, comprising:
providing a livestock shed having a floor area over which livestock can move freely;
providing a plurality of lights arranged to illuminate respective different regions of the floor area so that, collectively, the lights are able to illuminate substantially all of the floor area;
providing a plurality of cameras arranged to view respective different regions of the floor area so that, collectively, the cameras are able to view substantially all of the floor area;
providing livestock in the livestock shed on the floor area;
providing a controller operatively connected to the lights and to the cameras;
receiving and analysing signals from the cameras with the controller;
controlling, with the controller, at least one of the lights to adjust illumination provided to the floor area by said at least one of the lights in a manner dependent on the signals from the cameras, wherein said adjustment of the illumination comprises adjusting a wavelength spectrum of the illumination, wherein
a) the controller analyses the signals from the cameras to determine the lighting intensity in a plurality of different regions of the floor area and wherein the controller controls the lights to maintain the lighting intensity within a predetermined range of intensities for all of said different regions;
b) said signals comprise images and the controller analyses the images;
c) the analysis of the images identifies individual ones of the livestock;
d) the controller estimates the average size and/or weight of individual ones of the livestock based on an estimate of the area of the floor area covered by the livestock and a number of individual livestock in the floor area;
e) the controller analyses a plurality of images taken at different times, identifies a same individual one of the livestock in each of the images and estimates a velocity for said same individual based on the different positions of the same individual in the images and the times of the images; and
f) the controller identifies a dead individual one of the livestock and raises an alert.

4. A method according to claim 3, wherein
a) the receiving and analysis of the signals and the controlling of the at least one of the lights are automated; and
b) the livestock are chickens.

* * * * *